United States Patent [19]

Roberts

[11] 4,371,138

[45] Feb. 1, 1983

[54] DEVICE FOR MOUNTING EQUIPMENT IN VEHICLES

[76] Inventor: Herbert B. Roberts, 219 Glen Cove Dr., Chesterfield, Mo. 63017

[21] Appl. No.: 99,493

[22] Filed: Dec. 3, 1979

[51] Int. Cl.³ .......................................... F16M 11/00
[52] U.S. Cl. ..................................... 248/201; 108/44; 224/42.11; 224/273; 248/226.2
[58] Field of Search ..................... 248/201, 226.2, 346; 224/273, 275, 320, 321, 326, 42.11; 211/86; 108/44; 403/43

[56] References Cited

U.S. PATENT DOCUMENTS

| | | | |
|---|---|---|---|
| 1,974,158 | 9/1934 | Okenfuss | 248/346 UX |
| 2,057,980 | 10/1936 | Ringzelli | 248/226.2 X |
| 2,521,938 | 9/1950 | Nitenson | 248/346 UX |
| 2,589,520 | 3/1952 | Wallenius | 248/226.2 X |
| 2,867,248 | 1/1959 | Forney | 248/346 X |
| 2,893,521 | 7/1959 | Austin | 403/43 X |
| 2,897,974 | 8/1959 | Cook | 224/273 X |
| 2,899,162 | 8/1959 | Young | 224/273 X |
| 2,969,900 | 1/1961 | Heuler | 224/42.11 X |
| 3,153,501 | 10/1964 | Binding | 224/320 |
| 3,163,287 | 12/1964 | Barnett | 108/44 X |
| 4,061,971 | 12/1977 | Barrons | 248/346 X |

Primary Examiner—James A. Leppink
Assistant Examiner—George A. Suchfield
Attorney, Agent, or Firm—Haverstock, Garrett & Roberts

[57] ABSTRACT

This invention relates to a device for mounting equipment in vehicles such as citizen band transceivers, stereo components and the like wherein the device is comprised of components adaptable for multiple adjustments in order to utilize the transmission housing hump in the front portion of rear drive vehicles as a base but also adapted to be adjusted to accommodate the various size vehicles available on the market today and also adapted to adjust the height of the portable equipment to make it easily reachable from the driver's seat or from the front passenger seat. The devices of this invention are also inexpensive to produce and easily assembled with a screwdriver and a pair of pliers by unskilled persons.

3 Claims, 5 Drawing Figures

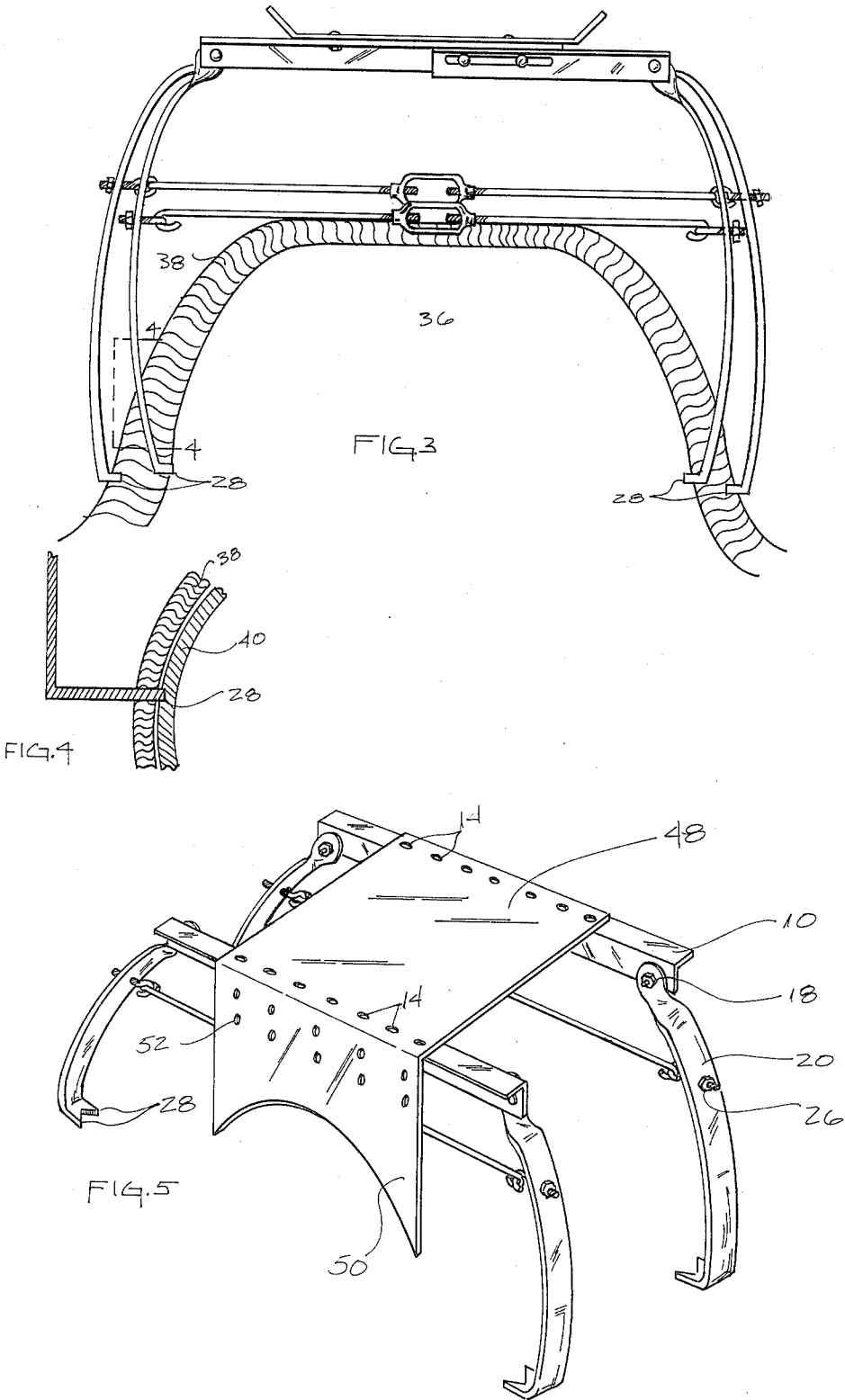

DEVICE FOR MOUNTING EQUIPMENT IN VEHICLES

GENERAL DESCRIPTION

This invention is a device suitable for mounting portable equipment such as citizen band transceivers, stereo components and the like about the transmission housing hump in the front portion of rear drive vehicles comprised of:

(1) at least two horizontal transverse mounting brackets,
(2) legs mounted on opposite ends of said transverse mounting brackets and in hinged relation therewith,
(3) means for tightening said legs into abutting relationship with said transmission housing hump, and,
(4) means for mounting said portable equipment on said transverse mounting brackets.

PRIOR ART

Various devices are available on the market today for mounting CB transceivers, stereo equipment and other similar portable units. One such device is comprised of a base made of a rigid material such as metal having rigid flaps hinged on the side and having Velco adhesive strips mounted or attached to the rigid wings for the purpose of holding the mounting device on top of the transmission hump in an automobile. Such devices are not adjustable and therefor cannot be adapted to a particular automobile or to a particular piece of equipment. Such devices may become loose and upset expensive and delicate equipment when turning a corner or during sudden stops.

Another mounting device, made from molded plastic materials, is in the form of a one piece rigid structure. These plastic devices have projections molded into the structure which are supposed to penetrate the material covering a transmission hump and hold the structure and mounted portable equipment in place. With the variations in size of automobiles and consequence variation in size of transmission humps such molded plastic structures cannot be adapted to be moved from one automobile to another and actually are adapted to fit only one such automobile. Metal brackets are available on the market suitable for mounting directly on the transmission hump by means of bolts or metal screws which penetrate completely through the transmission hump housing. Obviously, such devices provide a point for rust where the bolts or screws penetrate through the housing and most new car purchasers are most reluctant to start boring holes through their transmission hump housing. Most portable equipment now comes with brackets adapted to mount the units under the dash. As automobiles get smaller and employ more and more plastic components, particularly around the dash, there is inadaquate room for mounting such portable equipment under the dash and the plastic components of the dash are not well suited for holding the equipment. A further disadvantage is the fact that such equipment cannot be easily removed from the automobile for security.

This invention overcomes all of the disadvantages of the prior art structures by providing an inexpensive mounting device with multiple adjustments which make it adaptable for mounting portable equipment in different makes of automobiles at such heights as to be easily reached from the driver's seat or from the passenger seat.

OBJECTS

It is a principal object of this invention to provide an adjustable mounting device suitable for mounting portable equipment such as citizen band transceivers, stereo components and the like about the transmission housing hump in the front portion of rear drive vehicles.

It is another object of this invention to provide an inexpensive and easy to assemble adjustable device suitable for mounting portable equipment on top of the transmission housing hump of automobiles which is inexpensive and easy to assemble with only a screwdriver and a pair of pliers.

A further object of this invention is to provide a device suitable for mounting portable equipment such as citizen band transceivers, stereo components and the like but adapted to use as a base the male portion of a slide mount.

BRIEF DESCRIPTION OF THE DRAWINGS

FIG. 3 is a cross section of the device of this invention for mounting portable equipment in autos shown in position about the transmission housing hump.

FIG. 4 is a cross section of a portion of a leg showing a tooth biting through the covering over the transmission housing hump and into the metal taken along the lines 4—4 of FIG. 3.

FIG. 5 is perspective of the device of this invention showing a plate for mounting optional equipment.

DESCRIPTION OF THE PREFERRED EMBODIMENT

Figure 1:
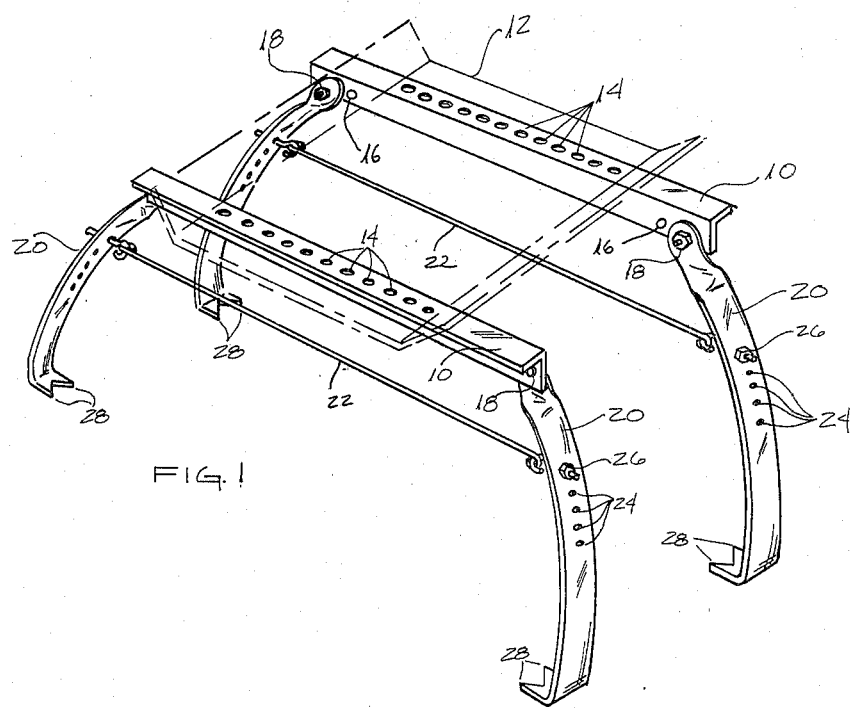
FIG. 1 is a perspective view of the device of this invention for mounting portable equipment in autos.

Referring to the drawings, FIG. 1 shows a perspective view of the device of this invention. Horizontal transverse mounting brackets 10 form the support for a mounting base 12. The mounting base 12 may be in the form of a plate which lends rigidity to the device. The mounting base 12 may also be in form of the male portion of a slide mount which mates with the female portion which has attached the portable equipment being mounted in the automobile. Also, certain types of portable equipment such as certain citizen band transceivers, have extensions as part of the unit which can be attached directly to the transverse mounting brackets to form a rigid structure. The transverse mounting brackets 10 contain openings 14 which are adapted to retain mounting bolts for attaching the base 12 to the transverse mounting brackets. As a convenience in assemblying the unit, the horizontal transverse mounting brackets are generally in the form of right angle elongated pieces which are generally made from metal such as iron, aluminum, or various alloys. Alternatively, the right angle horizontal transverse mounting brackets may be made from extruded or cast plastic materials such as polyvinyl chloride, polycarbonates, polyolefins such as polypropylene, nylons, styrene copolymers etc. The horizontal transverse right angle mounting brackets also contain openings 16 on the side at right angle to the top and which is generally in a position vertical to the portable equipment to be mounted. The openings 16 are adapted to retain bolts 18 which are used to attach the legs 20 to the horizontal transverse mounting brackets in hinged relationship thereto. Any other means may be used to attach the legs 20 to the horizontal transverse mounting brackets in hinged relationship thereto.

Opposite legs 20 are held in fixed relationship about the transmission hump by means of rods 22 which are adapted to pass through opposite pairs of openings 24 in the legs and threaded to receive tightening nuts 26. The nuts 26 are tightened on each end until the legs are held in rigid relationship about the transmission hump. The rods 22 are preferrably made of a metal such as iron or aluminum or various alloys, and, alternatively may be made from heavy duty plastics such as those mentioned above in connection with the transverse mounting brackets.

The legs 20 will have teeth 28 which are generally at right angle to the lower extremity of the legs and which are adapted to bite through the covering over the transmission housing hump and into the metal of the hump without penetrating completely through the hump. More than one tooth adds stability to the device when mounted for service and two or more teeth may be arranged so that the teeth towards the front of the hump are slightly shorter in order to accommodate the elliptical contour of the transmission housing hump. However, a single tooth on each leg is sufficient. The teeth may be conveniently made by bending the end of the legs into the desired position at approximate right angle to the leg when the legs are made from metal and may be molded into the legs when the legs are made from plastic materials.

Figure 2:
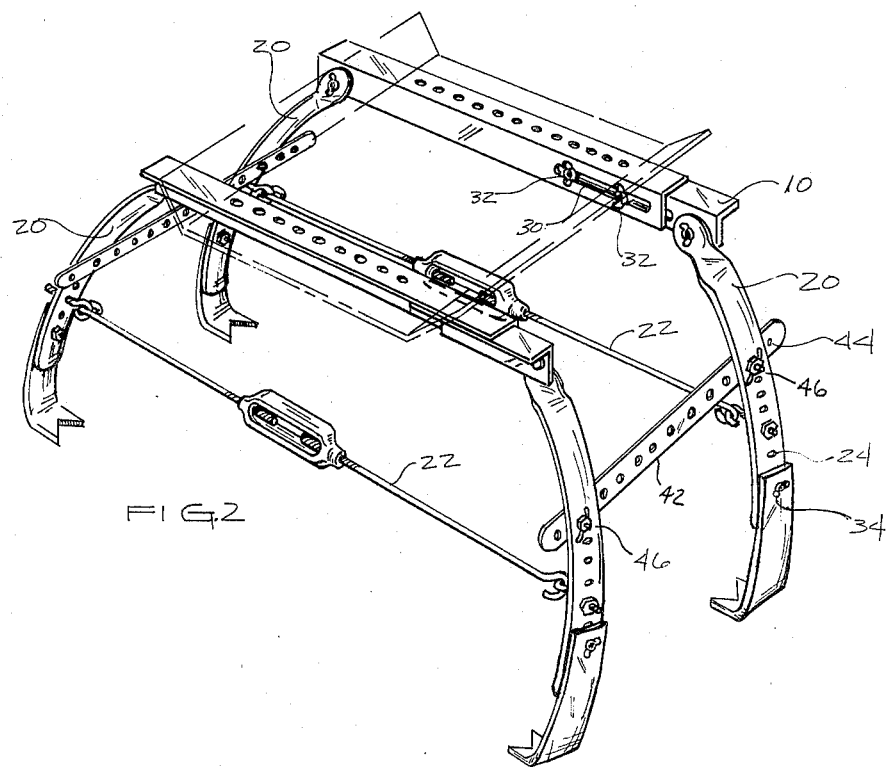
FIG. 2 is a detailed perspective view of the device of this invention for mounting portable equipment in autos.

Referring specifically to FIG. 2, the connecting rods 22 are shown in two pieces connected together with a turn buckle in the approximate center of each. Use of such a turn buckle provides an alternative tightening device which may avoid the necessity for cutting off the ends of the rods when the device is mounted about the transmission housing hump of an automobile.

The horizontal transverse mounting brackets are shown in FIG. 2 in the form of over-lapping right angle structures having slots 30 and held together by wing nuts 32 in order to provide a device which can be adjusted to the right length for a particular automobile hump and unit of portable equipment.

Also in FIG. 2, the legs 20 are shown in two piece over-lapping sections with matching openings 24 and again held together by means of wing nuts 34 to provide a further adjustment in order to adapt the device for use in various size automobiles with various size transmission housing humps.

FIG. 3 is a cross section showing the device of this invention mounted in place about a transmission housing hump 36. The teeth 28 should be mounted as low as possible on the transmission hump in order to provide maximum stability for the mounting device.

FIG. 4 is a cross section taken along the lines 4—4 of FIG. 3 showing the teeth 28 of the legs 20 biting through the hump mount covering material 38 and into the metal transmission housing hump 40.

An optional brace 42 containing a multiplicity of openings 44 may be attached to the legs 20 on opposite sides of the hump by means of wing nuts 46 to add further stability to the mounting device of this invention.

FIG. 5 is a perspective which shows the device of this invention with the base being in the form of a plate 48 with an angled overhang 50 containing openings 52 adapted for mounting optional equipment such as external speakers.

In order to adapt the mount of this invention to any hump surface, it may be necessary to bend the legs at the twist point located near the connection with the base. Although not shown in the drawings, any conventional hinge device, adapted to provide lateral movement in connection with the attachments of the legs to the base, may be used in the practice of this invention.

While the preferred embodiments of the invention have been illustrated and described, it will be understood by those skilled in the art that modifications and changes in the construction of the mounting device and materials of construction of the invention can be made within the spirit and scope of the invention as defined in the claims.

What is claimed is:

1. A device suitable for mounting equipment such as citizen band transceivers, stero components and the like about the transmission housing hump in the front portion of rear drive vehicles comprised of:
    (1) at least two horizontal transverse mounting brackets comprised of over-lapping right angle structures with matching openings therein,
    (2) legs mounted on opposite ends of said transverse mounting brackets and in hinged relation therewith,
    (3) means for tightening said legs into abutting relationship with said transmission housing hump, and,
    (4) means for mounting said portable equipment on said transverse mounting brackets.

2. A device suitable for mounting equipment such as citizen band transceivers, stereo components and the like about the transmission housing hump in the front portion of rear drive vehicles comprised of:
    (1) at least two horizontal transverse mounting brackets,
    (2) legs mounted on opposite ends of said transverse mounting brackets and in hinged relation therewith having generally curved portions adapted to transverse said transmission housing hump in generally abutting relations thereto and adapted to be lengthened and shortened in order to be adaptable to different transmission housing humps,
    (3) means for tightening said legs into abutting relationship with said transmission housing hump, and,
    (4) means for mounting said portable equipment on said transverse mounting brackets.

3. A device according to claim 2 wherein said legs are comprised of at least two pieces of over-lapping elongated structures containing matching attachment openings.

* * * * *